Patented Dec. 26, 1933

1,940,662

UNITED STATES PATENT OFFICE 1,940,662

WATERINSOLUBLE DISAZODYESTUFFS

Heinrich Clingestein, Cologne, and Karl Dobmaier, Leverkusen-on-the-Rhine, Germany, assignors to General Aniline Works, Inc., New York, N. Y., a corporation of Delaware No Drawing. Application December 4, 1929, Serial No. 411,669, and in Germany December 5, 1928

8 Claims. (Cl. 260—76)

The present invention relates to new waterinsoluble dis-azodyestuffs and to the materials dyed therewith.

In accordance with the present invention, waterinsoluble dis-azodyestuffs, dyeing yellow shades are obtainable by coupling with a di-(aceto-acetic arylide) which is not substituted by a carboxylic acid-, sulfonic acid or hydroxy group, a diazo compound of an ortho-aminobenzophenone, which may be substituted in the nuclei, for example by halogen, methyl or methoxy, but which should not be substituted by a carboxylic acid-, sulfonic acid-, or hydroxy group.

Our new dyestuffs may be represented by the following general formula:

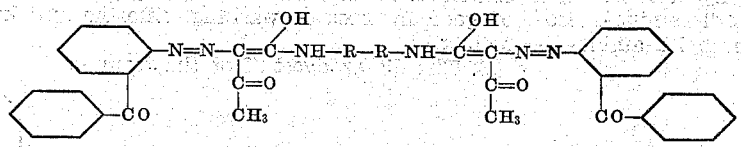

wherein R stands for an aromatic nucleus, such as a benzene or naphthalene nucleus, and wherein the nuclei may contain substituents with the exception of a carboxylic acid-, sulfonic acid or hydroxy group.

In their dry pulverized form, the new dyestuffs are generally yellow powders; they are insoluble in water, soluble in sulfuric acid and yield upon reduction with stannous chloride and hydrochloric acid the starting ortho-aminobenzophenone and a di-(aminoaceto-acetic arylide). The dyeings prepared on the fiber are distinguished by an excellent fastness to washing, chlorine and kier boiling.

In preparing the dyestuffs on the fiber, especially on cotton, the material to be dyed is impregnated with a grounding liquor, containing the di-(aceto-acetic arylide), centrifuged, wrung, and developed for about ½ hour in a diazo bath, rinsed, soaped at the boil, rinsed and dried.

For dyeing 50 grams of cotton, the grounding liquor is prepared by dissolving together about ½ gram to about 5 grams of the di-(aceto-acetic arylide) about 1 to about 10 c. c. caustic soda lye of 34° Bé., and about 1 to about 10 c. c. Turkey red oil of 50% strength, and making up the whole with water to 1 liter.

The developing bath is prepared by diazotizing about 1 gram to about 3 grams of the orthoaminobenzophenone with about 1 to about 3 c. c. of hydrochloric acid of 22° Bé. and about 3 to about 9 c. c. of sodium nitrite 1:10, while cooling with ice. When diazotization is complete, the liquid is neutralized with about 4 to about 20 c. c. of sodium acetate 1:5, whereupon 10 grams of common salt are added, and the whole is made up with water to 1 liter.

The following examples serve to illustrate our invention, without limiting it thereto.

Example 1.—Well boiled and dried cotton yarn is impregnated with an alkaline solution containing per liter:—

12 grams of diacetoacetic-o-tolidide,
20 c. c. of caustic soda 34° Bé.,
25 c. c. of Turkey red oil, wrung out and developed without drying in a bath of diazotized-o-aminobenzophenone to which sodium acetate has been added. The cotton is thereby dyed an intense pure greenish yellow. The dyeing is remarkably fast to light, kier boiling, chlorine and washing. The dyestuff has the probable formula:

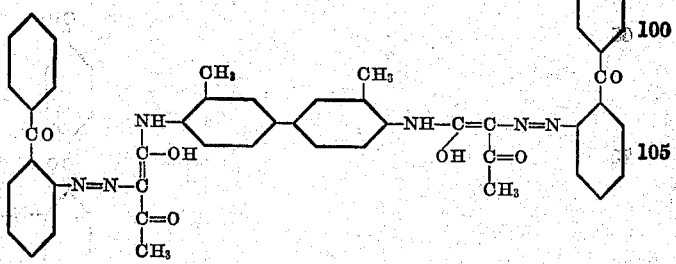

By treating the dyestuff with hydrochloric acid and stannous chloride it yields di-(amino-acetoacetic-o-tolidide) and o-aminobenzophenone.

*Example 2.*—When working as outlined in Example 1 but using thereby 4'-methyl-2-amino-diphenyl-ketone and diaceto-o-tolidide, a yellow is obtained. The dyestuff has the probable formula:—

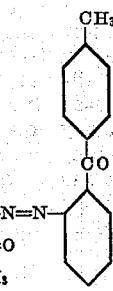

By treating the dyestuff with hydrochloric acid and stannous chloride it yields di-(amino-acetoacetic-o-tolidide) and 4'-methyl-2-amino-diphenyl ketone.

We claim:—
1. Dis-azodyestuffs of the general formula:

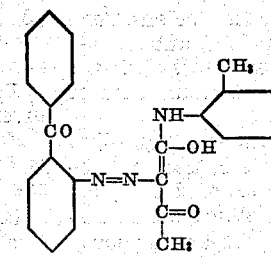

wherein R stands for an aromatic nucleus of the benzene or naphthalene series and wherein the nuclei may contain substituents with the exception of a carboxylic acid-, sulfonic acid- and hydroxy-group, being insoluble in water, soluble in sulfuric acid, and dyeing yellow shades of good fastness to washing, chlorine and kier boiling.

2. Dis-azodyestuffs of the general formula:

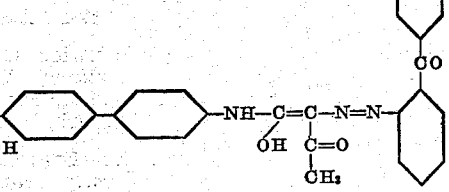

wherein the nuclei may contain substituents with the exception of a carboxylic acid-, sulfonic acid- and hydroxy-group, being insoluble in water,

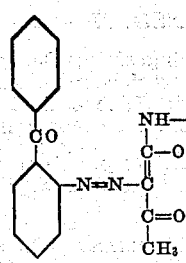

soluble in sulfuric acid, and dyeing yellow shades of good fastness to washing, chlorine and kier boiling.

3. The dis-azodyestuff of the formula

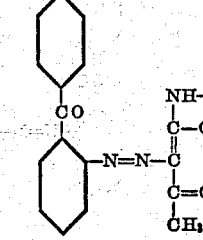

being insoluble in water, soluble in sulfuric acid, and dyeing yellow shades of good fastness to washing, chlorine and kier boiling.

4. The disazo dyestuff of the formula:

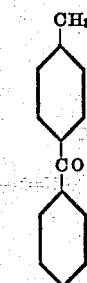

said dyestuff being insoluble in water, soluble in sulfuric acid and dyeing yellow shades of good fastness to washing, chlorine and kier boiling.

5. Fiber dyed with the dyestuff claimed in claim 1.

6. Fiber dyed with the dyestuff claimed in claim 2.

7. Fiber dyed with the dyestuff claimed in claim 3.

8. Fiber dyed with the dyestuff claimed in claim 4.

HEINRICH CLINGESTEIN. [L. S.]
KARL DOBMAIER. [L. S.]